United States Patent
Imahori et al.

(10) Patent No.: US 9,147,508 B2
(45) Date of Patent: Sep. 29, 2015

(54) WIRE HOLDING DEVICE AND WIRE HARNESS

(71) Applicant: Hitachi Metals, Ltd., Tokyo (JP)

(72) Inventors: Masaaki Imahori, Hitachinaka (JP); Takahiro Futatsumori, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 137 days.

(21) Appl. No.: 13/932,580

(22) Filed: Jul. 1, 2013

(65) Prior Publication Data

US 2014/0008122 A1 Jan. 9, 2014

(30) Foreign Application Priority Data

Jul. 4, 2012 (JP) .................................. 2012-150177

(51) Int. Cl.
| | |
|---|---|
| *H01R 4/00* | (2006.01) |
| *H01B 17/30* | (2006.01) |
| *H01B 7/00* | (2006.01) |
| *H02G 3/08* | (2006.01) |
| *H02G 3/06* | (2006.01) |

(52) U.S. Cl.
CPC ............ *H01B 17/308* (2013.01); *H01B 7/0045* (2013.01); *H02G 3/088* (2013.01); *H02G 3/0675* (2013.01); *H02G 3/083* (2013.01)

(58) Field of Classification Search
USPC ........... 174/65 R, 73.1, 74 R, 78, 84 R, 84 C; 439/98, 559, 552, 610, 556, 97
See application file for complete search history.

(56) References Cited

U.S. PATENT DOCUMENTS

| | | | | |
|---|---|---|---|---|
| 3,216,091 | A | * | 11/1965 | Floyd, Jr. .......................... 29/863 |
| 3,703,623 | A | * | 11/1972 | Swengel, Sr. ............. 219/137 R |
| 3,744,128 | A | * | 7/1973 | Fisher et al. .................... 29/858 |
| 5,691,506 | A | * | 11/1997 | Miyazaki et al. ............. 174/652 |
| 6,042,396 | A | * | 3/2000 | Endo et al. ....................... 439/98 |
| 6,358,069 | B2 | * | 3/2002 | Yoshioka et al. ............. 439/108 |
| 6,716,071 | B2 | | 4/2004 | Miyazaki |
| 7,614,910 | B2 | * | 11/2009 | Croteau et al. ................ 439/573 |
| 2002/0173181 | A1 | * | 11/2002 | Matsumoto ...................... 439/98 |
| 2003/0171042 | A1 | | 9/2003 | Miyazaki |
| 2004/0229508 | A1 | * | 11/2004 | Miyazaki et al. ............. 439/607 |

* cited by examiner

*Primary Examiner* — William H Mayo, III
(74) *Attorney, Agent, or Firm* — Roberts Mlotkowski Safran & Cole P.C.

(57) ABSTRACT

A wire holding device includes a seal holding member provided with an insertion hole into which an electric wire is inserted and which is provided with an opening, the seal holding member being configured to be housed in an attachment hole formed on an attachment target, an outer periphery sealing member for sealing a gap between an inner surface of the attachment target inside the attachment hole and the seal holding member, an inner periphery sealing member for sealing a gap between the electric wire and the seal holding member, and a wire holder aligned with the seal holding member along the electric wire. The seal holding member and the wire holder are relatively movable in a circumferential direction of the electric wire. The opening has such a diameter as to allow an end face of the inner periphery sealing member to be seen through the opening.

10 Claims, 6 Drawing Sheets

WIRE HOLDING DEVICE AND WIRE HARNESS

The present application is based on Japanese patent application No. 2012-150177 filed on Jul. 4, 2012, the entire contents of which are incorporated herein by reference.

BACKGROUND OF THE INVENTION

1. Field of the Invention

The invention relates to a wire holding device for holding an electric wire while sealing a gap between an attachment hole formed on an attachment target (or attached member) and the electric wire. Also, the invention relates to a wire harness provided with the wire holding device and the electric wire.

2. Description of the Related Art

A connector (or wire holding device) is known that is fixed to, e.g., a case (attachment target) of a device such as an inverter for supplying an electric current to a motor of an electric vehicle and holds an electric wire inserted through an attachment hole formed on the case (see, e.g., JP-A-2002-373737).

The connector disclosed in JP-A-2002-373737 is composed of a shield shell formed of die-cast aluminum and a resin housing inserted into the shield shell. An electric wire and a terminal crimped to a tip portion of the electric wire are held on the housing. The terminal and the electric wire are integrated with the housing by a resin mold. In addition, an annular seal groove is formed on an outer periphery of the housing and a sealing ring is placed in the seal groove.

For attaching the connector to the device, the housing is fitted in the attachment hole of the case and the shield shell is bolted to the case by a bolt which penetrates through a bolt hole formed on an attachment portion of the shield shell. Inside the case, the terminal crimped to the tip portion of the electric wire is fixed and electrically connected to a terminal of the device by a bolt.

SUMMARY OF THE INVENTION

The connector disclosed in JP-A-2002-373737 has the following problems. That is, drag turning, which is rotation of the attachment portion of the shield shell together with the bolt, occurs at the time of bolting the shield shell to the case and the shield shell may be fixed in a tilted state with respect to the case. In such a tilted state, the housing accommodated in the shield shell inevitably tilts together with the shield shell, which results in that a gap between the housing and the attachment hole may be locally enlarged. Then, a sealing property of the sealing member decreases at the enlarged portion of the gap and water, etc., may enter easily into the case.

It is an object of the invention to provide a wire holding device and a wire harness in which a tilt of a seal holding member holding a seal interposed between an inner periphery of an attachment hole and an outer periphery of an electric wire is suppressed even when drag turning occurs at the time of attaching the wire holding device to a case of another device by bolting, thereby allowing a sealing property to be ensured.

(1) According to one embodiment of the invention, a wire holding device comprises:

a seal holding member provided with an insertion hole into which an electric wire with a terminal connected to a tip portion thereof is inserted and which is provided with an opening at an end portion on the terminal side, the seal holding member being configured to be housed in an attachment hole formed on an attachment target;

an outer periphery sealing member on an outer periphery of the seal holding member for sealing a gap between an inner surface of the attachment target inside the attachment hole and the seal holding member;

an inner periphery sealing member between an outer peripheral surface of the electric wire and an inner peripheral surface of the seal holding member inside the insertion hole for sealing a gap between the electric wire and the seal holding member; and a wire holder aligned with the seal holding member along the electric wire for being fixed to the attachment target while holding the electric wire, wherein the seal holding member and the wire holder are relatively movable in a circumferential direction of the electric wire, and wherein the opening has such a diameter as to allow an end face of the inner periphery sealing member to be seen through the opening.

In the above embodiment (1) of the invention, the following modifications and changes can be made.

(i) The outer peripheral surface of the electric wire does not contact with an end portion of the seal holding member on the opening side when the terminal of the electric wire is attached to a terminal block.

(ii) The seal holding member comprises a projection protruding toward the electric wire at the end portion of the insertion hole on the opening side, and wherein the projection covers a part of an outer peripheral portion of the end face on the terminal side of the inner periphery sealing member.

(iii) The wire holder is provided with a holding hole for holding the electric wire and a housing space for housing the electric wire, the holding hole being defined by an inner surface to contact with the outer peripheral surface of the electric wire, and wherein the housing space has a larger inner diameter than the holding hole and is disposed closer to the seal holding member side than the holding hole.

(iv) The seal holding member and the wire holder comprise a locking mechanism for being engaged with each other.

(v) The locking mechanism comprises a locking protrusion formed on the seal holding member and a locked portion formed on the wire holder.

(vi) A gap is formed between the longing protrusion and the locked portion such that the seal holding member and the wire holder are relatively movable in the circumferential direction of the electric wire.

(2) According to another embodiment of the invention, a wire harness comprises:

the wire holding device according to the above embodiment (1); and the electric wire.

In the above embodiment (2) of the invention, the following modifications and changes can be made.

(vii) The electric wire comprises a plurality of electric wires, wherein a plurality of the insertions holes are formed in the seal holding member, and wherein a plurality of the inner periphery sealing members are each held between the outer peripheral surface of the plurality of electric wires and the plurality of insertion holes.

Points of the Invention

According to one embodiment of the invention, a wire holding device is constructed such that a seal holding member (or retainer) and a wire holder are separate components, and the retainer and a shield shell with the wire holder are relatively movable when fixing the shield shell to an attachment target (or case) by a bolt. Accordingly, even when the shield shell and the wire holder rotate together with the bolt about a through-hole by the tightening torque of the bolt when attaching a fixing portion to the attachment target and are tilted with respect to the attachment hole, the positional variation of the retainer to the attachment hole caused by the tilting can be suppressed. Therefore, a gap between the retainer and an inner surface of the attachment target (or case) inside the attachment hole can be kept to such an appropriate size such that a sealing property of the outer periphery sealing member is thereby maintained.

BRIEF DESCRIPTION OF THE DRAWINGS

Next, the present invention will be explained in more detail in conjunction with appended drawings, wherein:

FIGS. 3A and 3B show cross sections of a wire holding device, wherein

FIGS. 5A to 5C show a wire holding device in a second embodiment of the invention, wherein

DETAILED DESCRIPTION OF THE PREFERRED EMBODIMENTS

First Embodiment

Figure 1:
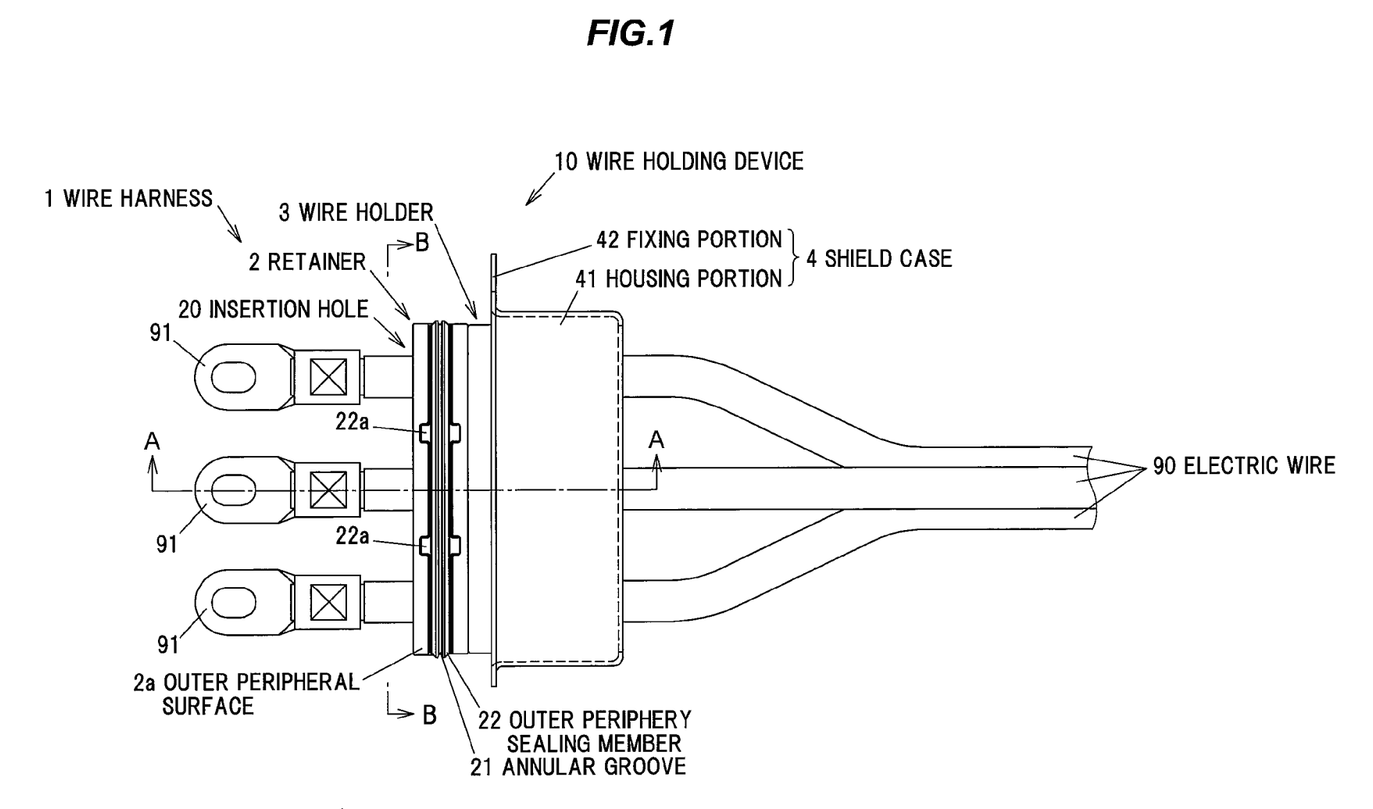
FIG. 1 is a front view showing a wire harness in a first embodiment of the present invention.

FIG. 1 is a front view showing a wire harness 1 in the first embodiment of the invention.

The wire harness 1 is provided with three electric wires 90 each having a terminal 91 connected to a tip portion by crimping and a wire holding device 10 for holding the three electric wires 90. The wire holding device 10 has a retainer 2 as a seal holding member, a wire holder 3 for holding the three electric wires 90 and a shield shell (or shield case) 4 for housing a portion of the wire holder 3.

The retainer 2 and the wire holder 3 are aligned in a running direction of the three electric wires 90. The retainer 2 has three insertion holes 20 for inserting the three electric wires 90 and an annular groove 21 formed on an outer peripheral surface 2a. An outer periphery sealing member 22 formed of, e.g., silicon rubber, etc., is held in the annular groove 21. Plural protrusions 22a protruding in a direction orthogonal to an extending direction of the outer periphery sealing member 22 are formed on the outer periphery sealing member 22 to stop the outer periphery sealing member 22 from whirling.

The retainer 2 and the wire holder 3 are formed of a resin having electrical insulating properties such as PBT (polybutylene terephthalate), PA (polyamide) or PPS (polyphenylene sulfide), and are formed by, e.g., injection molding.

The shield shell (or shield case) 4 is formed of a conductive metal such as iron, brass or aluminum, and integrally has a housing portion 41 for housing at least a portion of the wire holder 3 and a plate-like fixing portion 42 for fixing the shield shell 4 to an attachment target.

Figure 2:
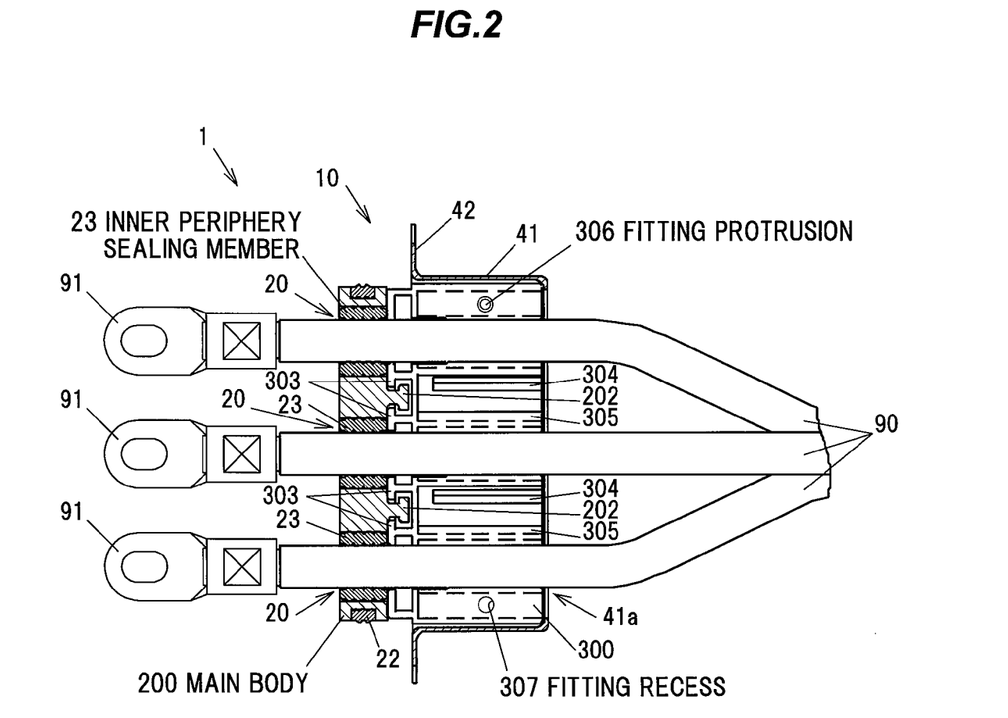
FIG. 2 is a cross sectional view of the wire harness taken along a running direction of an electric wire.

FIG. 2 is a cross sectional view of the wire harness 1 taken along the running direction of the electric wire 90.

On the housing portion 41 of the shield shell 4, openings 41a for inserting the three electric wires 90 are formed on a surface opposite to the retainer 2. The three electric wires 90 are inserted into the shield shell 4 through the openings 41a, pass through holding holes 31 of the blow-described wire holder 3 and the insertion holes 20 of the retainer 2, and are then exposed to the outside of the retainer 2.

The wire holder 3 is composed of a pair of resin members 30 which face each other with the three electric wires 90 interposed therebetween, and each resin member 30 is locked and coupled to each other. It should be noted that FIG. 2 shows only one of the resin members 30. In the first embodiment, each resin member 30 is formed in the same shape.

Each resin member 30 integrally has a main body 300 having plural (three in the first embodiment) small-diameter grooves 301 and plural (three in the first embodiment) large-diameter grooves 302 formed thereon, two coupling hooks 304 and two locking portions 305 for coupling the resin members 30 to each other. In addition, a fitting protrusion 306 and a fitting recess 307 are formed on the main body 300 to determine relative positions of the respective resin members 30.

The coupling hook 304 is engaged with the locking portion 305 formed on the other resin member 30. In addition, the coupling hook 304 formed on the other resin member 30 is engaged with the locking portion 305. Furthermore, the fitting protrusion 306 is fitted to the fitting recess 307 formed on the other resin member 30 and the fitting protrusion 306 formed on the other resin member 30 is fitted to the fitting recess 307.

By coupling a pair of resin members 30, the three electric wires 90 are sandwiched between the small-diameter grooves 301 of one of the resin members 30 and those of the other resin member 30 and thus are held all together by the wire holder 3.

In addition, on the resin member 30, two pairs of locking protrusions 303 for locking the retainer 2 are provided integrally with the main body 300.

The retainer 2 is arranged on the terminal 91 side with respect to the wire holder 3 along the running direction of the three electric wires 90.

On the retainer 2, two locked portions 202 to be respectively locked to the two pairs of locking protrusions 303 of the wire holder 3 are formed respectively between two adjacent insertion holes 20. The locking protrusions 303 and the locked portions 202 form a locking mechanism for engaging the retainer 2 with the wire holder 3 while allowing them to be movable relative to each other. A gap is formed between the locking protrusions 303 and the locked portion 202, and accordingly, the retainer 2 and the wire holder 3 are relatively movable in a circumferential direction of the electric wire 90 even in a state of being locked to each other by the locking protrusions 303 and the locked portions 202.

Figure 3A:
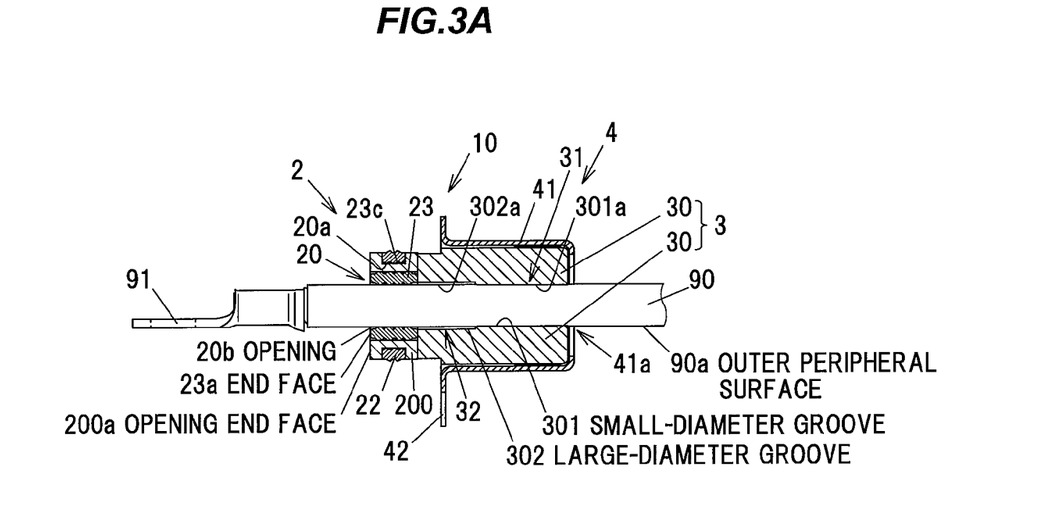
FIG. 3A is a cross sectional view taken on line A-A of FIG. 1
Figure 3B:
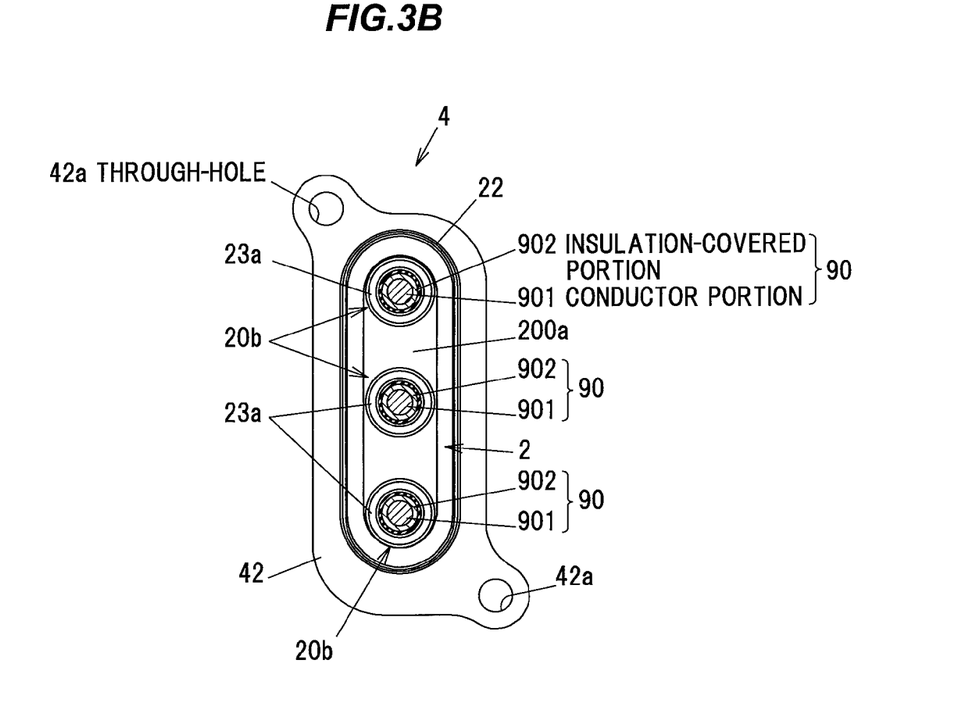
FIG. 3B is a cross sectional view taken on line B-B of FIG. 1.

FIGS. 3A and 3B show cross sections of the wire holding device 10, wherein FIG. 3A is a cross sectional view taken on line A-A of FIG. 1 and FIG. 3B is a cross sectional view taken on line B-B of FIG. 1.

The small-diameter groove 301 and the large-diameter groove 302 are formed as a groove having an arcuate cross-section and extending along the running direction of the three electric wires 90. Three holding holes 31, which are arranged at positions where inner surfaces 301a of the three small-diameter grooves 301 of the respective resin members 30 face each other and respectively hold the three electric wires 90, are formed by joining the pair of resin members 30. Likewise, three cylindrical housing spaces 32, which are arranged at positions where inner surfaces 302a of the three large-diameter grooves 302 of the respective resin members 30 face each other and respectively house the three electric wires 90, are formed.

The small-diameter groove 301 is formed to have an inner diameter smaller than a diameter of each of the three electric wires 90. In other words, the inner surface 301a of the small-diameter groove 301 presses an outer peripheral surface 90a of the electric wire 90, thereby holding the electric wire 90. The large-diameter groove 302 is formed to have an inner diameter larger than the diameter of each of the three electric wires 90. Accordingly, the wire holder 3 has gaps between the three electric wires 90 and the inner surfaces 302a of the large-diameter grooves 302 in the housing spaces 32. This allows the electric wire 90 to be bent in the housing space 32 when the retainer 2 and the wire holder 3 relatively move, which allows smooth relative movement between the retainer 2 and the wire holder 3. Note that, the gap is exaggeratingly shown in FIG. 3A for the purpose of explanation.

The electric wire 90 has a conductor portion 901 formed of a metal such as copper and an insulation-covered portion 902 formed of an insulation covering the conductor portion 901. In the retainer 2, an end face thereof on the terminal 91 side is formed as an opening end face 200a having openings 20b of the three insertion holes 20.

In each of three insertion holes 20 of the retainer 2, a cylindrical inner periphery sealing member 23 formed of an elastic body such as silicon rubber is held between an inner peripheral surface 20a of the retainer 2 and the outer peripheral surface 90a of each of the three electric wires 90. The retainer 2 has higher rigidity than the inner periphery sealing member 23. In addition, at the opening 20b of the insertion hole 20, an inner diameter of the insertion hole 20 is larger than an outer diameter of the electric wire 90. The inner diameter of the insertion hole 20 at the opening 20b (the inner diameter of the opening 20b) is, e.g., about 1 to 10 mm larger than the outer diameter of the electric wire 90.

The inner periphery sealing member 23 has an end face 23a located on the terminal 91 side in a central axis direction of the insertion hole 20 and the end face 23a is exposed from the opening end face 200a of the retainer 2. In other words, when viewing the opening end face 200a of the retainer 2 from the terminal 91 side, the inner diameter of the insertion hole 20 at the opening 20b has a size allowing the end face 23a of the inner periphery sealing member 23 housed in the insertion hole 20 to be seen through the opening 20b. In the first embodiment, the end face 23a of the inner periphery sealing member 23 is flush with the opening end face 200a of the retainer 2.

Figure 4:
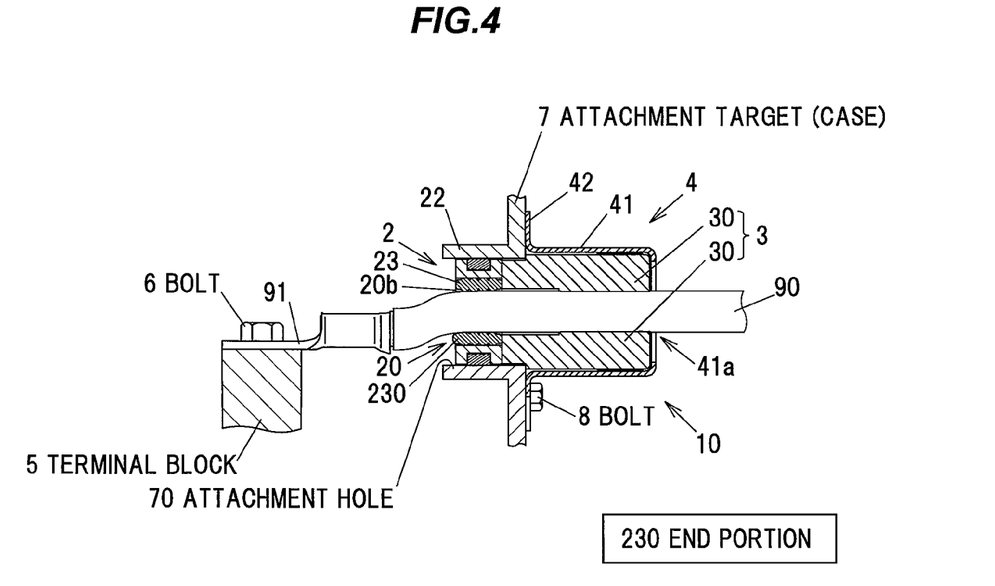
FIG. 4 is an explanatory diagram illustrating an example of usage state of the wire holding device.

FIG. 4 is an explanatory diagram illustrating an example of usage state of the wire holding device 10.

The shield shell 4 is fixed to an attachment target 7. In the following description of the first embodiment, the attachment target 7 is a case of an inverter for supplying an electric current to a motor of an electric vehicle. A terminal block 5 is arranged in the attachment target 7 (the case of the inverter). The terminal block 5 is used for connection between output terminals of a switching element of the inverter and the terminals 91 connected to the three electric wires 90.

For attaching the shield shell 4 to the attachment target 7, as shown in FIG. 4, the retainer 2 and the end portion of the wire holder 3 on the retainer 2 side are housed in an attachment hole 70 of the attachment target 7, and a bolt 8 penetrating through a through-hole 42a formed on the fixing portion 42 of the shield shell 4 is tightened and screwed into a non-illustrated threaded hole formed on the attachment target 7. After that, the terminal 91 is secured to the terminal block 5 by a bolt 6 inside the attachment target 7.

When the terminal 91 is secured to the terminal block 5 by the bolt 6, the electric wire 90 exposed from the retainer 2 on the terminal 91 side may be bent in a direction intersecting the running direction thereof due to drag turning which is rotation of the terminal 91 together with the bolt 6. In such a case, an end portion 230 of the inner periphery sealing member 23 which is located inside the insertion hole 20 on the terminal 91 side receives a pressing force from the electric wire 90 and is squashed against the inner peripheral surface 20a of the retainer 2 inside the insertion hole 20. However, in the first embodiment, since the end face 23a of the inner periphery sealing member 23 is flush with the opening end face 200a of the retainer 2, the inner periphery sealing member 23 is interposed between the outer peripheral surface 90a of the electric wire 90 and the inner peripheral surface 20a, and accordingly, the outer peripheral surface 90a of the electric wire 90 does not come into contact with the end portion of the retainer 2 on the opening 20b side.

Functions and Effects of the First Embodiment

The following functions and effects are obtained in the first embodiment.

(1) The retainer 2 and the wire holder 3 are separate components, and the retainer 2 and the shield shell 4 with the wire holder 3 are relatively movable when fixing the shield shell 4 to the attachment target 7 by the bolt 8. Accordingly, even when the shield shell 4 and the wire holder 3 rotate together with the bolt 8 about the through-hole 42a by the tightening torque of the bolt 8 when attaching the fixing portion 42 to the attachment target 7 and are tilted with respect to the attachment hole, the positional variation of the retainer 2 to the attachment hole 70 caused by the tilting can be suppressed. Therefore, a gap between the retainer 2 and an inner surface of the attachment target 7 inside the attachment hole 70 can be kept to such an appropriate size that a sealing property of the outer periphery sealing member 22 is thereby maintained.

(2) The retainer 2 is formed such that the inner diameter of the insertion hole 20 on the opening end face 200a on the terminal 91 side is larger than the outer diameter of the electric wire 90 and the inner periphery sealing member 23 is provided so that the end face 23a thereof in the central axis direction of the insertion hole 20 is exposed from the opening end face 200a of a main body 200 of the retainer 2. In other words, the insertion hole 20 is formed such that the inner diameter thereof at the opening 20b has a size allowing the end face 23a of the inner periphery sealing member 23 housed in the insertion hole 20 to be seen through the opening 20b. Accordingly, even if the electric wire 90 is bent between the retainer 2 and the terminal 91 at the time of fixing the shield shell 4 to the attachment target 7 by the bolt 8 and securing the terminal 91 to the terminal block 5 by the bolt 6, contact of the outer peripheral surface 90a of the electric wire 90 with the retainer 2 is prevented and tilt or positional variation of the retainer 2 inside the attachment hole 70 is suppressed. Therefore, it is possible to ensure a sealing property of the outer periphery sealing member 22 between the retainer 2 and the inner periphery of the attachment hole 70.

(3) Since the pressing force from the electric wire 90 is absorbed by the inner periphery sealing member 23, there is no risk that the outer peripheral surface 90a of the electric wire 90 comes into contact with the opening end face 200a of the main body 200 of the retainer 2 even if the electric wire 90 exposed from the retainer 2 on the terminal 91 side is bent in a direction orthogonal to the running direction thereof at the time of securing the terminal 91 to the terminal block 5 by the bolt 6. As a result, it is possible to reduce the tilt of the retainer 2 with respect to the attachment hole 70.

(4) Since the end portion of the wire holder 3 on the retainer 2 side is fitted into the attachment hole 70, drag turning of the shield shell 4 and the wire holder 3 with respect to the attachment hole 70 about the through-hole 42a is suppressed. In other words, the wire holder 3 can turn with respect to the attachment hole 70 only within a gap between the end portion thereof and the inner surface of the case 7 inside the attachment hole 70, which restricts positional variation of the wire holder 3 with respect to the attachment hole 70 and improves the sealing property of the outer periphery sealing member 22.

(5) Since the wire holder 3 has the cylindrical housing space 32 formed on the retainer 2 side and there is a gap between the electric wire 90 and the inner surface 302a of the large-diameter groove 302 inside the housing space 32, it is possible to suppress variation in position of the retainer 2 with respect to the attachment hole 70 even when the wire holder 3 is tilted with respect to the central axis of the insertion hole 20 of the retainer 2 due to, e.g., an external force acting on the electric wire 90. In other words, in case that, for example, the holding hole 31 of the wire holder 3 is formed to have a constant radius (a radius of the small-diameter groove 301) and if the wire holder 3 tilts such that the central axis of the holding hole 31 intersects the central axis of the insertion hole 20 of the retainer 2, the electric wire 90 inside the insertion hole 20 is pulled in a radius direction of the insertion hole 20 and the position of the retainer 2 inside the attachment hole 70 changes. However, having the large-diameter groove 302 suppresses such a change in the position and maintains the good sealing property of the outer periphery sealing member 22.

(6) Since, in the insertion holes 20, the inner periphery sealing members 23 are held on the inner peripheral surface 20a of the retainer 2 so as to correspond to the respective electric wires 90, the attachment target 7 is appropriately sealed tightly also on the inner peripheral side of the retainer 2.

(7) Since the locking protrusions 303 of the wire holder 3 are locked to the locked portions 202 of the retainer 2, it is possible to easily insert the retainer 2 and the wire holder 3 into the attachment hole 70. In addition, when the wire holder 3 is pulled out of the attachment hole 70 of the case 7, the retainer 2 is also pulled out of the attachment hole 70 accordingly. In other words, it is easy to attach and remove the wire harness 1 to and from the attachment target 7.

Although the case where the end face 23a of the inner periphery sealing member 23 is flush with the opening end face 200a of the retainer 2 has been described in FIG. 4, the end portion 230 of the inner periphery sealing member 23 may protrude from the insertion hole 20 of the retainer 2. Also in this case, the same functions and effects are obtained.

Second Embodiment

Figure 5A:
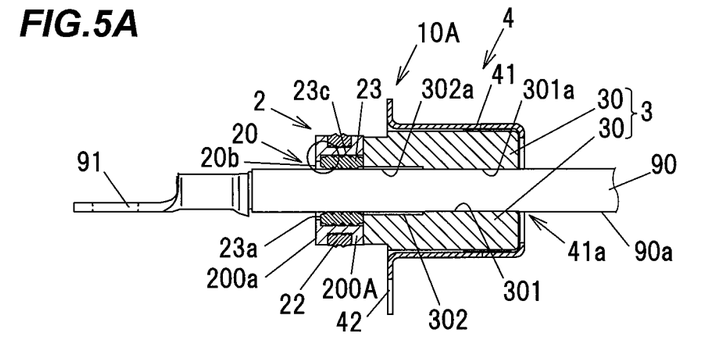
FIG. 5A is a cross sectional view.
Figure 5B:
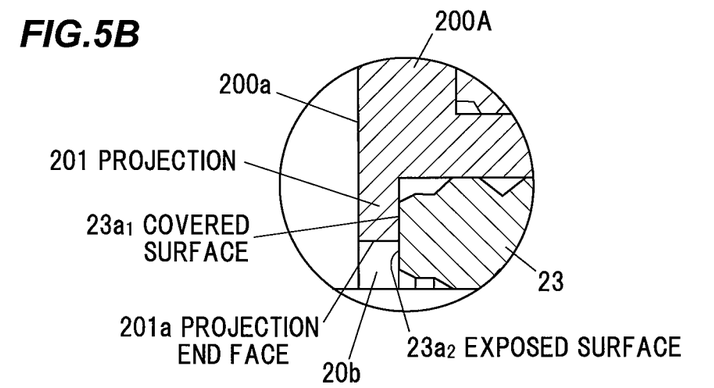
FIG. 5B is an enlarged view of FIG. 5A
Figure 5C:
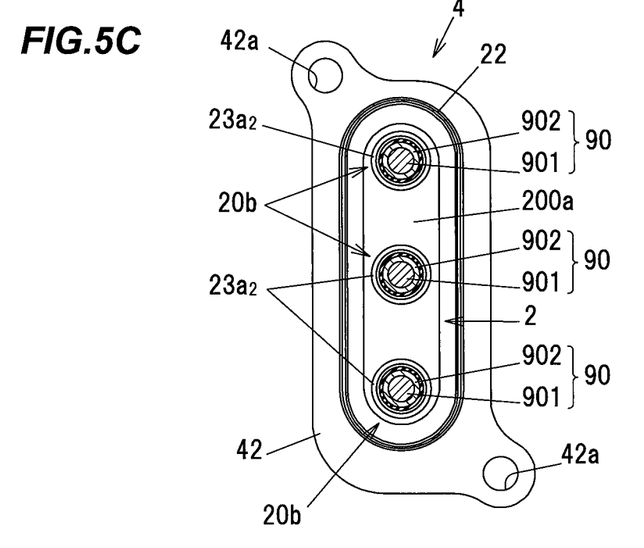
FIG. 5C is a cross sectional view as viewed from a terminal side in the running direction of the electric wire.

FIGS. 5A to 5C show a wire holding device 10A in the second embodiment of the invention, wherein FIG. 5A is a cross sectional view, FIG. 5B is an enlarged view of FIG. 5A and FIG. 5C is a cross sectional view as viewed from the terminal 91 side in the running direction of the electric wire 90. The shape of a main body 200A of the retainer 2 is different from the shape of the main body 200 in the first embodiment. Since the remaining structure is the same as the first embodiment, the reference numerals in FIGS. 1 to 4 are used and the overlapped explanation will be omitted.

On the main body 200A of the retainer 2 in the second embodiment, a projection 201 protruding toward the electric wire 90 is formed at an end portion of the insertion hole 20 on the opening 20b side, as shown in FIG. 5B. The projection 201 is an annular protrusion which protrudes inward of the insertion hole 20 and covers an outer peripheral portion (a covered surface $23a_1$) of the end face 23a of the inner periphery sealing member 23 on the terminal 91 side. In other words, an inner peripheral portion (an exposed surface $23a_2$) of the end face 23a of the inner periphery sealing member 23 is exposed on the terminal 91 side. Comparing FIG. 5C with FIG. 3B, a surface area of the inner periphery sealing member 23 exposed from the retainer 2 is smaller in FIG. 5C (the surface area of the exposed surface $23a_2$<the surface area of the end face 23a).

A projection end face 201a, which is an end face of the projection 201 on the inner peripheral side, is formed to have a circumference larger than the outer diameter of the electric wire 90.

Figure 6:
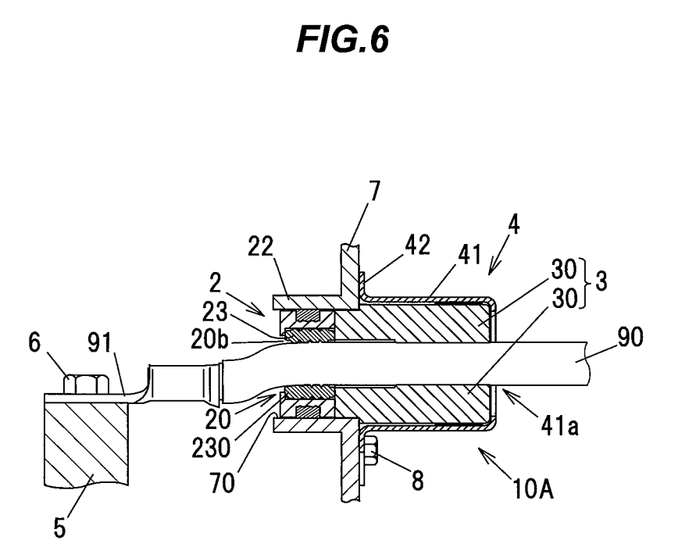
FIG. 6 is an explanatory diagram illustrating an example of usage state of the wire holding device in the second embodiment of the invention.

FIG. 6 is an explanatory diagram illustrating an example of usage state of the wire holding device 10A in the second embodiment of the invention Similarly to the case shown in FIG. 4, when the terminal 91 is secured to the terminal block 5 by the bolt 6 after fixing the shield shell 4 to the attachment target 7 by the bolt 8, the electric wire 90 exposed from the retainer 2 on the terminal 91 side may be bent in a direction intersecting the running direction thereof. At this time, the end portion 230 of the inner periphery sealing member 23 which is located inside the insertion hole 20 on the terminal 91 side receives a pressing force of the electric wire 90 acting on the retainer 2 and is squashed against the inner peripheral surface 20a inside the insertion hole 20. The inner periphery sealing member 23 is formed of an elastic body such as silicon rubber and the outer peripheral surface 90a of the electric wire 90 does not come into contact with the projection end face 201a of the projection 201 of the retainer 2, also in FIG. 6.

The same functions and effects as (1) to (7) described in the first embodiment are obtained also in the second embodiment. Furthermore, it is possible to prevent the inner periphery sealing member 23 from slipping out of the retainer 2 by covering the covered surface $23a_1$ of the inner periphery sealing member 23 with the projection 201 of the retainer 2.

Although the embodiments of the invention have been described, the invention according to claims is not to be limited to the above-mentioned embodiments. Further, please note that all combinations of the features described in the embodiments are not necessary to solve the problem of the invention.

For example, the wire holder 3 may not be composed of a pair of resin members 30 in the embodiments.

In addition, the retainer 2 and the wire holder 3 may be formed of a metal, not a resin.

In addition, the number of the electric wires 90 held by the wire holder 3 is not limited and may be one, two or four.

In addition, the attachment target 7 to which the wire harness 1 is attached is not specifically limited and the invention is applicable to a case, etc., of, e.g., a communication device or an information processor.

What is claimed is:

1. A wire holding device, comprising:
a seal holding member provided with an insertion hole into which an electric wire with a terminal connected to a tip portion thereof is inserted and which is provided with an opening at an end portion on the terminal side, the seal holding member being configured to be housed in an attachment hole formed on an attachment target;

an outer periphery sealing member on an outer periphery of the seal holding member for sealing a gap between an inner surface of the attachment target inside the attachment hole and the seal holding member;

an inner periphery sealing member between an outer peripheral surface of the electric wire and an inner peripheral surface of the seal holding member inside the insertion hole for sealing a gap between the electric wire and the seal holding member; and a wire holder aligned with the seal holding member along the electric wire for being fixed to the attachment target while holding the electric wire, wherein the seal holding member and the wire holder are relatively movable in a circumferential direction of the electric wire when both are fixed to the attachment target, and wherein the opening has such a diameter as to allow an end face of the inner periphery sealing member to be seen through the opening.

2. The wire holding device according to claim 1, wherein the outer peripheral surface of the electric wire does not contact with an end portion of the seal holding member on the opening side when the terminal of the electric wire is attached to a terminal block.

3. The wire holding device according to claim 1, wherein the seal holding member comprises a projection protruding toward the electric wire at the end portion of the insertion hole on the opening side, and wherein the projection covers a part of an outer peripheral portion of the end face on the terminal side of the inner periphery sealing member.

4. The wire holding device according to claim 1,
wherein the wire holder is provided with a holding hole for holding the electric wire and a housing space for housing the electric wire, the holding hole being defined by an inner surface to contact with the outer peripheral surface of the electric wire, and wherein the housing space has a larger inner diameter than the holding hole and is disposed closer to the seal holding member side than the holding hole.

5. A wire harness, comprising: the wire holding device according to claim 1; and
the electric wire.

6. The wire harness according to claim 5, wherein
the electric wire comprises a plurality of electric wires, wherein a plurality of the insertions holes are formed in the seal holding member, and wherein a plurality of the inner periphery sealing members are each held between the outer peripheral surface of the plurality of electric wires and the plurality of insertion holes.

7. The wire holding device according to claim 1, wherein the seal holding member and the wire holder comprise a locking mechanism for being engaged with each other.

8. The wire holding device according to claim 7, wherein the locking mechanism comprises a locking protrusion formed on the seal holding member and a locked portion formed on the wire holder.

9. The wire holding device according to claim 8, wherein the a gap is formed between the longing protrusion and the locked portion such that the seal holding member and the wire holder are relatively movable in the circumferential direction of the electric wire.

10. The wire holding device according to claim 1, wherein the inner periphery sealing member further comprises an end face located on the terminal side in a central axis direction of the insertion hole and the end face of the inner periphery sealing member is exposed from an opening end face of the seal holding member.

* * * * *